US008024358B2

(12) United States Patent  (10) Patent No.: US 8,024,358 B2
Raciborski et al.  (45) Date of Patent: *Sep. 20, 2011

(54) CONSISTENT BROWSER FILE DOWNLOAD (75) Inventors: Nathan F. Raciborski, Phoenix, AZ (US); Mohan I. Kokal, Peoria, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,835

(22) Filed: Mar. 18, 2010

(65) Prior Publication Data

US 2010/0235474 A1  Sep. 16, 2010

Related U.S. Application Data (63) Continuation of application No. 10/901,907, filed on Jul. 28, 2004, now Pat. No. 7,779,035.

(60) Provisional application No. 60/490,809, filed on Jul. 28, 2003.

(51) Int. Cl.
G06F 7/00 (2006.01)
G06F 17/30 (2006.01)

(52) U.S. Cl. ...................................... 707/782

(58) Field of Classification Search ........................ None
See application file for complete search history.

(56) References Cited

U.S. PATENT DOCUMENTS

| 6,237,006 | B1 | 5/2001 | Weinberg et al. | |
|---|---|---|---|---|
| 6,289,012 | B1 | 9/2001 | Harrington | |
| 6,427,140 | B1 | 7/2002 | Ginter et al. | |
| 6,675,212 | B1 | 1/2004 | Greenwood | |
| 6,950,804 | B2 | 9/2005 | Strietzel | |
| 6,990,630 | B2 | 1/2006 | Landsman et al. | |
| 7,149,958 | B2 * | 12/2006 | Landsman et al. | 715/205 |
| 7,254,622 | B2 * | 8/2007 | Nomura et al. | 709/219 |
| 7,316,033 | B2 | 1/2008 | Risan et al. | |
| 7,363,498 | B2 | 4/2008 | Hennessey et al. | |
| 7,363,499 | B2 | 4/2008 | Perlman | |
| 2001/0051996 | A1 | 12/2001 | Cooper et al. | |
| 2002/0052957 | A1 | 5/2002 | Shimada | |
| 2002/0077985 | A1 | 6/2002 | Kobata et al. | |
| 2002/0089534 | A1 * | 7/2002 | Siekmann | 345/738 |
| 2003/0014630 | A1 | 1/2003 | Spencer et al. | |

(Continued)

FOREIGN PATENT DOCUMENTS

WO  WO 01/11466 A2  2/2001

OTHER PUBLICATIONS

Cherry, S. M. "Making music pay [digital music distribution]", Spectrum, IEEE vol. 38, Issue 10, Oct. 2001, pp. 41-46.

(Continued)

*Primary Examiner* — Sathyanarayan Pannala (74) *Attorney, Agent, or Firm* — Kilpatrick Townsend & Stockton LLP (57) ABSTRACT

According to the invention, a system for downloading audio or video to a browser is disclosed. The system includes a media server, a content database and a web page. The content database includes the content object, and the content database is linked to the media server. The web page presented to the browser and includes a link to the content object. The link avoids activating an autoplay feature of the browsers should the link be activated.

19 Claims, 5 Drawing Sheets

U.S. PATENT DOCUMENTS

| | | |
|---|---|---|
| 2003/0105835 A1 | 6/2003 | Hori et al. |
| 2003/0195974 A1 | 10/2003 | Ronning et al. |
| 2004/0019497 A1 | 1/2004 | Volk et al. |
| 2004/0024688 A1 | 2/2004 | Bi et al. |
| 2004/0064573 A1 | 4/2004 | Leaning et al. |
| 2004/0254958 A1 | 12/2004 | Volk |
| 2005/0131983 A1 | 6/2005 | Raciborski et al. |
| 2005/0132083 A1 | 6/2005 | Raciborski et al. |

OTHER PUBLICATIONS

Open Mobile Alliance, Generic Content Download over the Air Specification, Version 1.0 (Announcement Open Mobile Alliance), Jun. 20, 2002, pp. 1-40, XP002264099.

Waller et al., "Securing the delivery of digital content over the Internet", Electronics & Communication Engineering Journal, vol. 14, Issue 5, Oct. 2002, pp. 239-248.

* cited by examiner

CONSISTENT BROWSER FILE DOWNLOAD

This application claims the benefit of and is a continuation of U.S. application Ser. No. 10/901,907, filed on Jul. 28, 2004, which is a continuation in part (or non-provisional) of U.S. Application Ser. No. 60/490,809 filed on Jul. 28, 2003, which are incorporated by reference in their entirety.

This application is related to U.S. patent application Ser. No. 10/901,893, filed on Jul. 28, 2004, entitled "MULTIPLE OBJECT DOWNLOAD", which is incorporated by reference in its entirety.

BACKGROUND OF THE DISCLOSURE

This disclosure relates in general to network file download and, more specifically, but not by way of limitation, to downloading files using a web browser over a wide area network.

Modern browsers such as INTERNET EXPLORER™ 6 (IE6) by MICROSOFT™ have been optimized to automatically detect the types of downloaded objects off the Internet, for the purposes of selecting the most appropriate application to execute the downloaded content. For example, file extensions for content objects are associated with an application such that download of any file with that extension will automatically activate the associated application to begin playback of the content object. Unfortunately, with auto-detection, end-users maybe subjected to the "Media Bar" autoplay feature within IE6 or some other application that plays the content as it is downloaded. For example, activation of the Media Bar initiates streaming playback and not a download with a "Save As" pop-up menu if the end-user has in the past selected the option to have IE6 auto-play similar items. For example, a left-click on a content object would bring up the Media Bar and begin playback of the content even though the end-user may wish to save the content object for playback at a later time.

When end-users running web browsers, such as IE6, request a multimedia object off a web server on the Internet, the browser has an intelligent monitor or process known as the URL Moniker that analyzes the beginning of the content to determine it's type. Once the browser has determined the content type, it will automatically try to play the content object in the browser's Media Bar or other associated application, if it's of a multimedia type such as a movie or a song that has been previously played with the Media Bar. Further, the autoplay feature does not give the user the ability to choose where the multimedia object is stored.

The media industries seem to be trending toward allowing end-users to 'download' the objects (i.e., music, movies, TV-shows, etc) rather than limiting them to streaming playback of the object while online. The end-user often discovers after clicking on a content object and playing it, that that the song they played can no longer be found on their local system for further playback. The end-user can get trapped in just watching or listening to the media objects without ever saving them to the own local hard drive by left-clicking on the content object.

SUMMARY

A system for downloading audio or video to a browser includes a media server, a content database that includes the content object, wherein the content database is linked to the media server, and a web page presented to the browser. The web page includes a link to the content object, and the link avoids activating an autoplay feature of the browser when the link is activated.

A method for causing a web browser to save a content object rather than performing streamed playback includes providing a link to the content object that avoids an autoplay feature of the web browser, where the autoplay feature performs streamed playback of the content object. The method further includes detecting that a user has activated the link, causing activation of a dialog window that allows the user to choose a location to save the content object when the link is activated, and downloading the content object to the location.

A system for causing a web browser to save a content object rather than performing streamed playback includes a link to the content object that avoids an autoplay feature of the web browser, where the autoplay feature performs streamed playback of the content object. The system further includes means for detecting that a user has activated the link, means for causing activation of a dialog window that allows the user to choose a location to save the content object when the link is activated, and means for downloading the content object to the location.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order o the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

This invention provides a method and apparatus to bypass Internet web browser-based mime type detection URL Moniker and automatic playing described above. This technique forces browsers to always ask whether the end-user wants to save the individual object rather than automatically initiating playback. This avoids the streaming playback and forces the user to save the content file. Today, the content provider who sells content objects wishes for the end-user to actually download the content via a "Save As" type dialog menu. Using the conventional technique, the end-user would have to manually go thru about five to seven steps to turn off the automatic playing feature (i.e., URL Moniker) for the particular download. Alternatively, end-users can right-click on a given content link and selecting the "Save As" or "Save Target As" option. Unfortunately, the right-click "Save As" option selection process is cumbersome and provides a support nightmare for novice end-users and content providers wanting to provide an easy solution.

One embodiment of the invention allows a content object that is left-clicked upon to be optionally downloaded rather than played. Providing a way to bypass the Media Bar playing experience when a file is left-clicked upon solves other problems as well. One example problem also solved is when the media player is prevented asking by the end-user's computer for the information in the .smi configuration file. The .smi configuration file is requested when an object is played by the Media Bar during download, whereas playback of an object stored on the computer does not request the .smi configuration file from the origin server.

To avoid the automatic Media Bar feature in one embodiment, the content provider adds a "popup-redirect" to the link for the content object, which ends up fooling the browser into prompting the end-user with a "Save As" dialog. The combination of the JavaScript popup window and iframe (i.e., a HTML or XHTML inline frame) is a method that allows the content provider to provide the "Save As" functionality with a left click for all users. In one embodiment, a simple redirect to the content is used, but does not always work because the browsers tend to follow thru on the link and then successfully are able to identify the content using the URL Moniker. Other embodiments could use other techniques to avoid the Media Bar activation such that a "Save As" dialog is produced instead.

Figure 1:
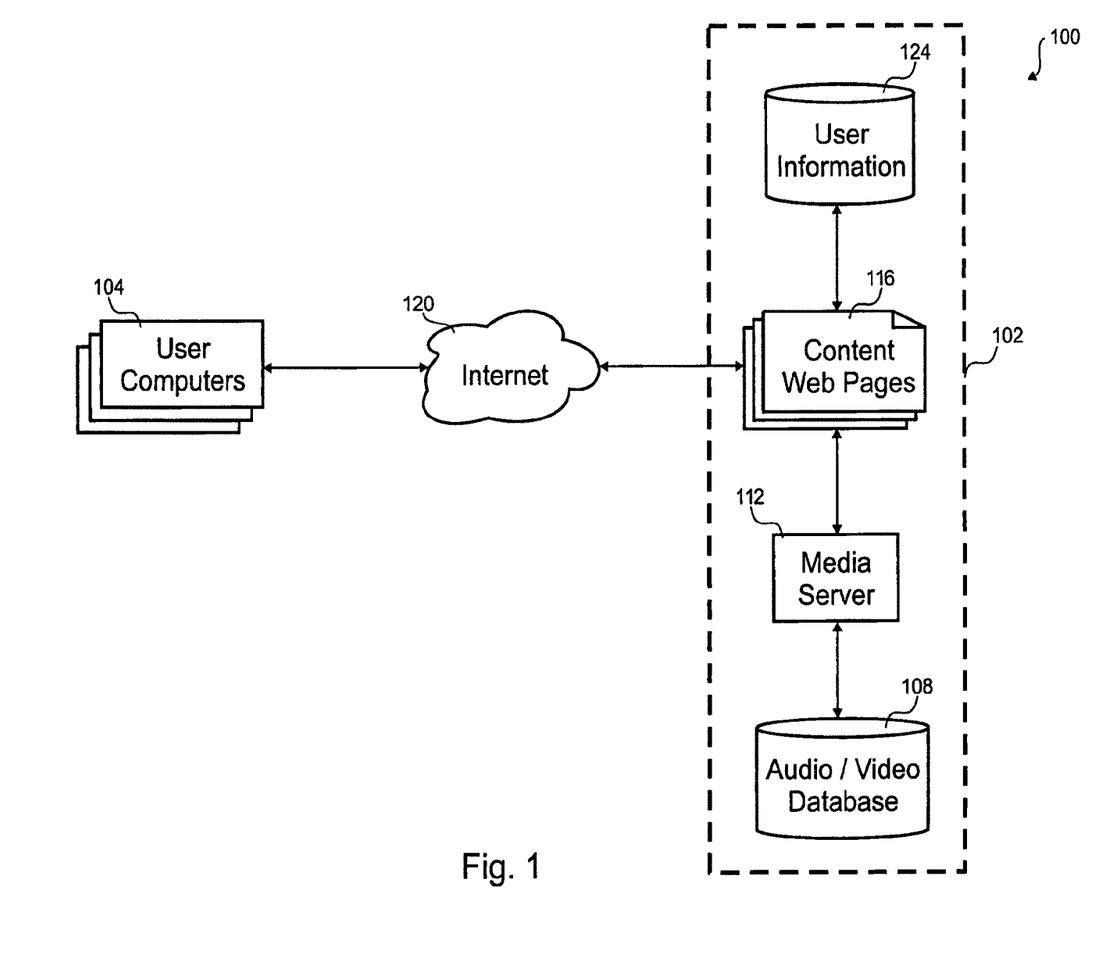
FIG. 1 is a block diagram of an embodiment of a media delivery system.

Referring initially to FIG. 1, a block diagram of an embodiment of a media delivery system 100 is shown. Any number of user computers 104 connect to a media site 102 to download one or more content objects over the Internet 120 or some other wide area network. In this embodiment, the content objects are audio and/or video (A/V) files, but other embodiments could include any type of files (e.g., software, text, animation, etc.).

The media site 102 serves the content objects to the various user computers 104. The media site 102 can have various configurations, but this embodiment includes content web pages 116, a media server 112, an audio and/or video database 108, and a user information database 124. Some embodiments may use content delivery networks to further enhance delivery.

The media server 112 formulates the web pages 116 with forms, links and other information to sign-up users, gather information on the users, allow ordering of content, allow linking to the content, bill the users for content, etc. Information about the user and the content they have ordered is stored in the user information database 124. The available content is stored in the audio and/or video database 108. The media server 108 formulates the web pages 116 and processes the content to ease download to the users. For content previously purchased, the media server 112 can allow later download by checking authorization in the user information database 124 for the rights to the previously purchased content. The media server 112 rewrites the web pages 116 to allow for a consistent download interface to users 216.

Figure 2:
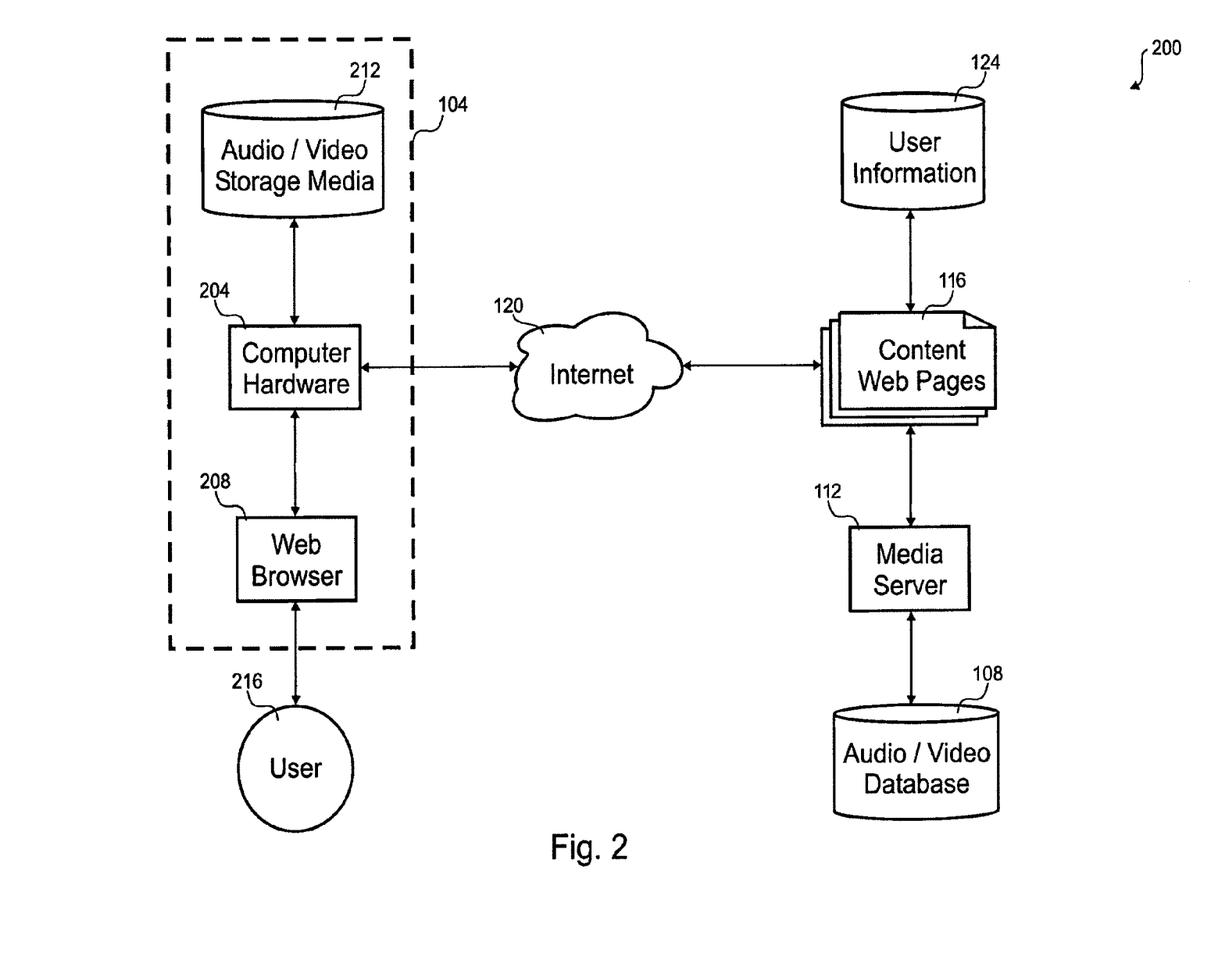
FIG. 2 is a block diagram of an embodiment of a single user interacting with the media delivery system.

With reference to FIG. 2, a block diagram of an embodiment of a single user 216 interacting with the media delivery system 100 is shown. In this embodiment, the user computer 104 is a personal computer, but it could be a PDA, cellular phone, gaming device, personal video recorder, or portable media player in other embodiments. The user computer 104 includes a web browser application 208 that interfaces with computer hardware 204 that runs the software, stores information and communicates with the Internet 120. One or more content objects are downloaded from the media site 102 are stored in an audio and/or video storage media 212, for example, a hard drive, flash memory, network attached storage, etc.

Although the above embodiment shows a single media site 102 supplying the content objects, other embodiments could come in a variety of configurations. One embodiment has many mirror media sites that are service different portions of the users 216. Other embodiments divide portions of the media site, but are coupled together with the Internet, a LAN and/or WAN. One embodiment uses a content delivery network to deliver the content objects. The links to the content objects in the web pages 116 are rewritten by the content delivery network to avoid the autoplay feature in some browsers. The content delivery network may have functions within the media site 102 or away from the media site to perform the rewriting.

Figure 3A:
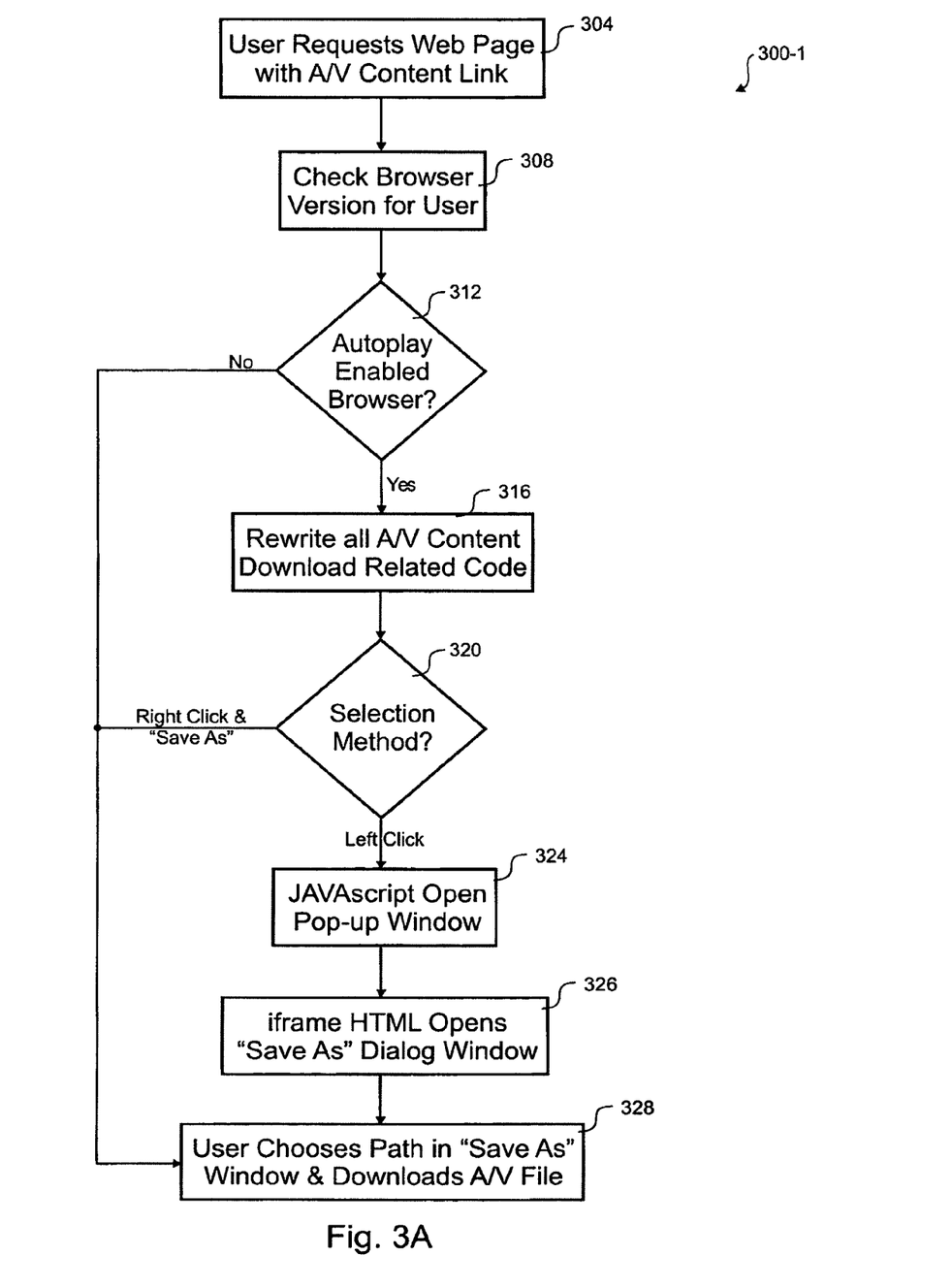
FIGS. 3A, 3B and 3C are flow diagrams of embodiments of a process for presenting a consistent download interface to users.

Referring to FIG. 3A, a flow diagram of an embodiment of a process for presenting a consistent download interface to users is shown. The depicted portion of the process begins in step 304 where the user 216 requests a web page 116 that includes links to one or more A/V content objects. In this embodiment, the web pages 116 formulated differently based upon the version of the web browser 208 in use. In step 308, the version is of the web browser 208 is noted. If it is not an autoplay enabled browser as determined in step 312, the web page 116 need not be rewritten and a "Save As" dialog is presented with a left click and the user saves and downloads the file in step 328.

The content download related code in the web page 116 is rewritten in step 316 such that the autoplay feature is no longer the default action with a left click on the link. The user 216 may still right click on the link and choose the "Save As" option as determined in step 320. If this is the case, processing continues to step 328.

Alternatively, a left click is handled in step 324 where a JavaScript in the web page 116 opens a pop-up window. The left click is really activation of the primary mouse button, which could be the right or left button, a voice command, a touch screen press, etc. that is recognized by the user computer 104 to mean normal activation of the link selected in the web browser 208. In this embodiment, the menu bar and/or button bar are eliminated from the pop-up window, but need not be in other embodiments. An iframe HTML command in the pop-up window opens a "Save As" dialog window in step 326. Any browser interpretable code, script, command, plug-in, feature bar, and/or application could be used to trigger the "Save As" dialog window.

In step 328, the user chooses the path and downloads the A/V content object to that path. Downloading involves the media site 102 configuring a protocol link to the computer hardware 204. Modulation, coding, and encryption may be involved in the protocol link. The A/V content object is stored on the audio and/or video storage media 212 at a location chosen by the user 216. The pop-up window could be automatically closed after the "Save As" dialog window is activated or closed in some embodiments.

Figure 3B:
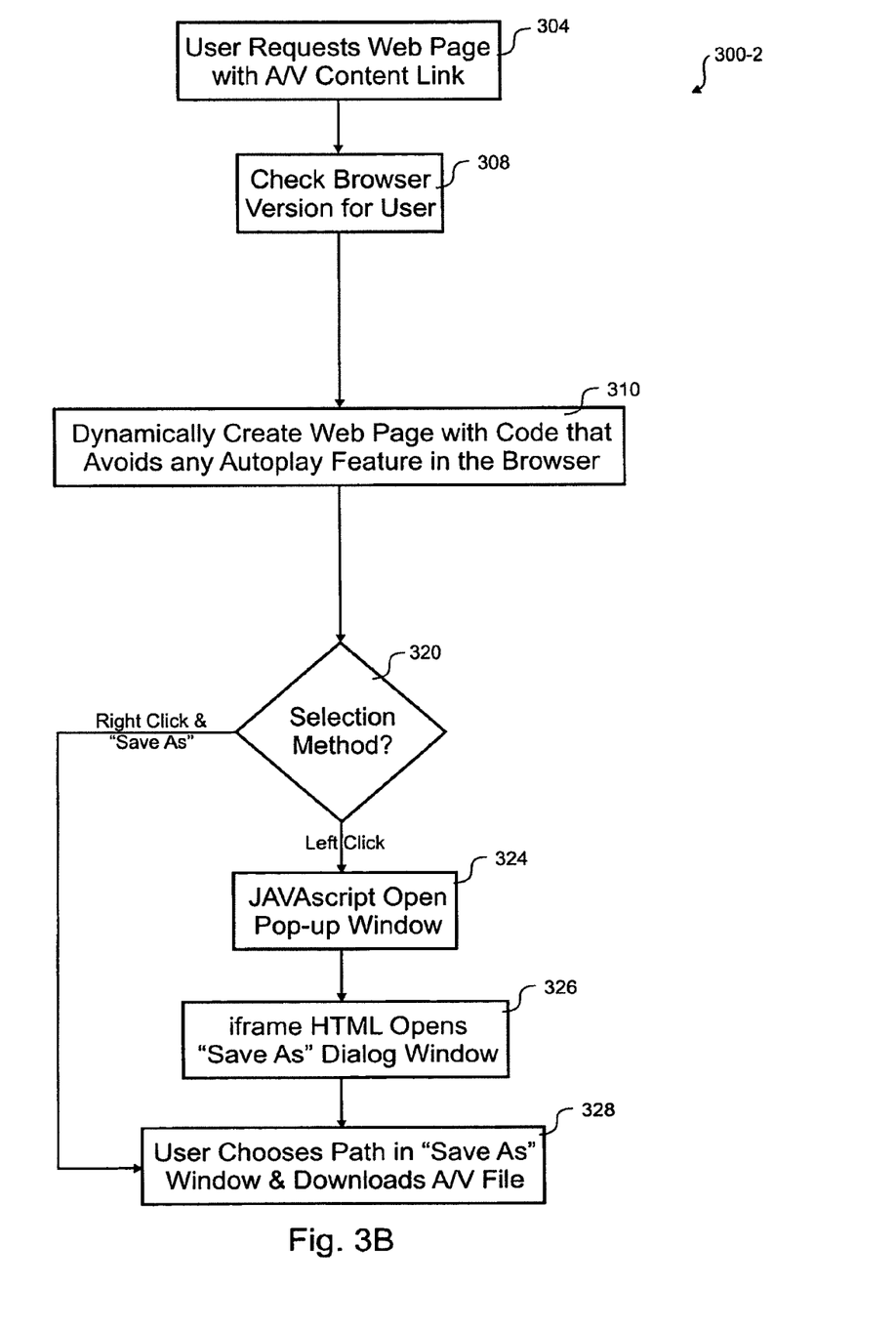

Although this embodiment rewrites the web pages 116 based upon the browser's autoplay capability. Some embodiments do not rewrite the web pages 116 after the fact, but formulate them with the browser capability in mind such as the embodiment 300-2 of FIG. 3B. This embodiment replaces steps 312 and 316 from FIG. 3A with new step 310 that creates the web page with the target web browser 208 in mind.

Figure 3C:
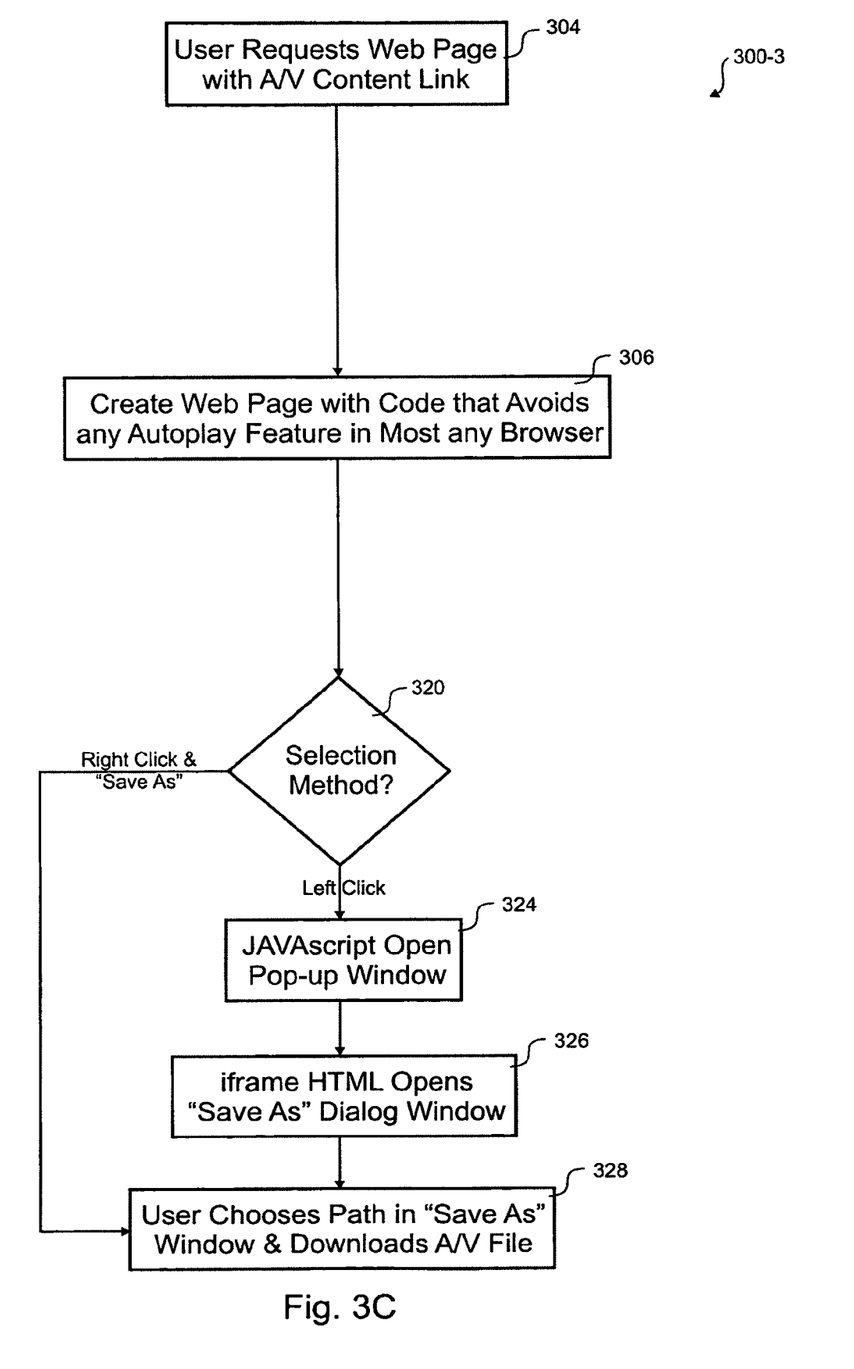

Other embodiments present web pages 116 that will not invoke the autoplay feature regardless of whether the browser has that capability such that the links to the content do not require different versions for different browsers 208. One example 300-3 of this is shown in FIG. 3C. Steps 308, 312 and 316 of FIG. 3A are replaced with new step 306 that presents a web page that is interpreted by most browsers 208 in a way that avoids the autoplay feature.

Although these embodiments use a particular set of browser code to disable the autoplay feature of a left click, other techniques are possible. Further, the capabilities of browsers are being updated over time. With new capabilities and understanding of the web browsers, new ways to implement the ideas in this disclosure may be possible.

While the principles of the invention have been described above in connection with specific apparatuses and methods, it is to be clearly understood that this description is made only by way of example and not as limitation on the scope of the invention.

What is claimed is:

1. A computer system for downloading audio or video with a browser rather than performing playback with a media playing application through an autoplay feature, the computer system comprising:
   memory;
   a processor;
   a media server stored in memory and executed by the processor;
   a content database that includes a content object comprising the audio or video, wherein the content database is linked to the media server; and
   a web page configured for presentation to the browser that is dynamically created with code that avoids activating the autoplay feature of the browser, wherein:
      the web page references a link to the content object, the content object being an object type that would automatically activate the autoplay feature of the browser when activated if directly referenced in the web page, and
      in response to an activation of the link, the content object is downloaded with the browser wherein the autoplay feature is avoided.

2. The computer system for downloading audio or video with the browser as recited in claim 1, wherein the web page is coded differently based upon whether the browser has the autoplay feature.

3. The computer system for downloading audio or video with the browser as recited in claim 1, wherein the web page is formulated by the media server.

4. The computer system for downloading audio or video with the browser as recited in claim 1, wherein the media player application is a separate application from the browser.

5. The computer system for downloading audio or video with the browser as recited in claim 1, wherein the content object is chosen from a group consisting of a video file and an audio file.

6. The computer system for downloading audio or video with the browser as recited in claim 1, wherein the autoplay feature allows selection of a location to save the content object.

7. The computer system for downloading audio or video with the browser as recited in claim 1, wherein the link is prepared by a device outside of the media site.

8. The computer system for downloading audio or video with the browser as recited in claim 1, wherein the link invokes a pop-up window.

9. The computer system for downloading audio or video with the browser as recited in claim 1, wherein the link invokes an iframe HTML command.

10. The computer system for downloading audio or video with the browser as recited in claim 1, wherein the link invokes HTML commands in a new window.

11. A method for downloading a content object with a web browser, the method comprising:
   dynamically creating a web page that references a link to a content object, the web page with code that avoids an autoplay feature in the web browser;
   providing the link to the content object, the content object is an object type that automatically activates the autoplay feature of the web browser, wherein:
      the autoplay feature of the web browser would normally automatically play the content object when activated if directly referenced in a web page, and the autoplay feature of the web browser performs playback of the content object in a media playing application that is a separate application from the web browser;

detecting that a user has activated the link; and in response to the detecting that a user has activated the link, downloading the content object to the browser wherein the autoplay feature is avoided.

12. The method for downloading a content object with a web browser as recited in claim 11, wherein the link invokes a pop-up window with a script command.

13. The method for downloading a content object with a web browser as recited in claim 11, wherein the link invokes an iframe HTML command that initiates the causing activation.

14. The method for downloading a content object with a web browser as recited in claim 11, wherein the providing comprises determining if the web browser has the autoplay feature.

15. The method for downloading a content object with a web browser as recited in claim 11, further comprising causing activation of a pop-up window has at least some toolbars deactivated.

16. A computer system for causing a web browser to download a content object rather than performing playback with a media playing application through an autoplay feature, the computer system comprising:

memory;

a processor;

media server means stored in memory and executed by the processor for dynamically creating a web page with code that avoids activating an autoplay feature in the web browser, means for referencing a link to the content object, the content object being an object type that would automatically activate the autoplay feature of the web browser, wherein:

the autoplay feature of the web browser would normally automatically play the content object when activated if directly referenced in a web page, and the content object comprises audio or video;

means for detecting that the link has been manually activated;

means for downloading the content object in response to detecting that the link has been manually activated, wherein:

the autoplay feature is avoided, and the media player application is a separate application from the web browser.

17. The computer system for causing a web browser to download a content object as recited in claim 16, wherein the link invokes a pop-up window with a script command.

18. The computer system for causing a web browser to download a content object as recited in claim 16, wherein the link invokes an iframe HTML command that initiates the causing activation step.

19. The computer system for causing a web browser to download a content object as recited in claim 16, wherein the link activates a process configured to allow saving the content object rather than automatically activating the autoplay feature of the web browser.

\* \* \* \* \*